United States Patent
Stoltz

(10) Patent No.: US 10,471,817 B2
(45) Date of Patent: Nov. 12, 2019

(54) THERMAL KINETIC ENERGY RECOVERY SYSTEM FOR HYBRID VEHICLE

(71) Applicant: Eaton Corporation, Cleveland, OH (US)

(72) Inventor: Thomas Stoltz, Allen Park, MI (US)

(*) Notice: Subject to any disclaimer, the term of this patent is extended or adjusted under 35 U.S.C. 154(b) by 0 days.

(21) Appl. No.: 16/138,262

(22) Filed: Sep. 21, 2018

(65) Prior Publication Data
US 2019/0023113 A1 Jan. 24, 2019

Related U.S. Application Data

(63) Continuation of application No. PCT/US2017/023317, filed on Mar. 21, 2017.
(Continued)

(51) Int. Cl.
| | |
|---|---|
| *B60K 6/12* | (2006.01) |
| *F01K 23/02* | (2006.01) |
| *B60L 7/28* | (2006.01) |
| *B60T 1/06* | (2006.01) |
| *F01K 23/14* | (2006.01) |
| *F01K 25/08* | (2006.01) |
| *F01K 23/06* | (2006.01) |
| *F01K 23/10* | (2006.01) |

(52) U.S. Cl.
CPC .................. *B60K 6/12* (2013.01); *B60L 7/28* (2013.01); *B60T 1/06* (2013.01); *F01K 23/02* (2013.01); *F01K 23/065* (2013.01); *F01K 23/10* (2013.01); *F01K 23/14* (2013.01); *F01K 25/08* (2013.01)

(58) Field of Classification Search
CPC ............................ F16D 57/02; F16D 2065/781

USPC ..... 188/267, 276, 158, 161, 162; 310/77, 54
See application file for complete search history.

(56) References Cited

U.S. PATENT DOCUMENTS

| | | | |
|---|---|---|---|
| 4,290,268 A * | 9/1981 | Lowther | B60K 6/08 180/165 |
| 4,691,593 A | 9/1987 | Mueller | |
| | | (Continued) | |

FOREIGN PATENT DOCUMENTS

JP  2011102105 A  5/2011

OTHER PUBLICATIONS

International Search Report and Written Opinion for International Application No. PCT/US2017/023317 dated Jun. 21, 2017, 10 pages.

*Primary Examiner* — Jeffrey J Restifo
(74) *Attorney, Agent, or Firm* — RMCK Law Group PLC

(57) ABSTRACT

A transmission system selectively coupled to an engine crankshaft of an internal combustion engine arranged on a vehicle includes a waste heat recovery (WHR) system, a brake assembly and a phase-change thermal heat storage system. The WHR system selectively circulates a WHR fluid in the transmission system. The brake assembly selectively couples a transmission output shaft to a drive axle. The brake assembly is configured to operate in a braking mode that retards relative rotation between the transmission output shaft and the drive axle while generating heat. The heat storage system includes a housing defining at least one cavity and a fluid transfer manifold. A phase-change material is disposed in the cavity that is configured to change phase during the braking mode. The WHR system circulates the WHR fluid through the fluid transfer manifold collecting braking heat to be used at a later time in the form of driveline power.

20 Claims, 2 Drawing Sheets

Related U.S. Application Data

(60) Provisional application No. 62/311,170, filed on Mar. 21, 2016.

(56) References Cited

U.S. PATENT DOCUMENTS

| | | | | |
|---|---|---|---|---|
| 4,895,233 A * | 1/1990 | Inoue | F16D 13/72 | 188/264 CC |
| 5,023,499 A * | 6/1991 | Kuwahara | H02K 49/043 | 188/164 |
| 5,064,029 A * | 11/1991 | Araki | H02K 49/043 | 188/164 |
| 5,145,038 A * | 9/1992 | Kuwahara | H02K 49/043 | 188/158 |
| 5,303,802 A * | 4/1994 | Kuwahara | B60L 7/003 | 188/158 |
| 5,613,578 A * | 3/1997 | Moseley | F16D 65/125 | 188/218 XL |
| 5,804,897 A * | 9/1998 | Kuwahara | H02K 49/043 | 188/267 |
| 5,855,256 A * | 1/1999 | Kuwahara | H02K 49/043 | 188/158 |
| 6,025,664 A * | 2/2000 | Kuwahara | H02K 49/043 | 188/158 |
| 6,039,157 A * | 3/2000 | Yamada | H02K 49/043 | 188/158 |
| 6,046,518 A * | 4/2000 | Williams | B60K 7/0007 | 310/43 |
| 6,149,544 A * | 11/2000 | Masberg | B60K 6/26 | 477/13 |
| 6,176,355 B1 * | 1/2001 | Yamamoto | H02K 49/043 | 188/158 |
| 6,209,688 B1 * | 4/2001 | Kuwahara | H02K 49/043 | 188/156 |
| 6,237,728 B1 * | 5/2001 | Kobayashi | H02K 49/043 | 188/158 |
| 6,328,142 B1 * | 12/2001 | Kuwahara | B60L 7/003 | 188/158 |
| 6,528,132 B1 * | 3/2003 | Naerheim | F16D 65/12 | 188/264 D |
| 6,543,588 B1 * | 4/2003 | Raad | B60L 7/00 | 180/65.22 |
| 6,948,597 B2 * | 9/2005 | Kuwahara | H02K 49/043 | 188/158 |
| 7,040,545 B2 * | 5/2006 | Tilly | B60H 1/038 | 237/12.3 R |
| 8,967,304 B2 * | 3/2015 | Klopzig | B60K 6/46 | 180/65.21 |
| 9,178,404 B2 * | 11/2015 | Li | H02K 21/12 | |
| 9,638,273 B2 * | 5/2017 | Schmidt | B60K 7/0007 | |
| 9,656,643 B2 * | 5/2017 | Yamaguchi | F16D 57/02 | |
| 9,933,032 B2 * | 4/2018 | Yamaguchi | B60L 7/06 | |
| 10,151,355 B2 * | 12/2018 | Elsesser | F16D 13/72 | |
| 2003/0116391 A1 * | 6/2003 | Desta | B60L 7/28 | 188/267 |
| 2010/0133031 A1 * | 6/2010 | Mendler | B60K 3/00 | 180/165 |

\* cited by examiner

THERMAL KINETIC ENERGY RECOVERY SYSTEM FOR HYBRID VEHICLE

CROSS-REFERENCE TO RELATED APPLICATIONS

This application is a continuation of International Application No. PCT/US2017/023317 filed Mar. 21, 2017, which claims priority to U.S. Provisional Application No. 62/311,170 filed on Mar. 21, 2016. The disclosure of the above application is incorporated herein by reference.

FIELD

The present disclosure relates generally to a transmission system and related method for operating a vehicle having a thermal-hybrid system.

BACKGROUND

The Rankine cycle or Organic Rankine Cycle (ORC) is a power generation cycle that converts thermal energy to mechanical work. The Rankine cycle is typically used in heat engines, and accomplishes the above conversion by bringing a working substance from a higher temperature state to a lower temperature state. The classical Rankine cycle is the fundamental thermodynamic process underlying the operation of a steam engine.

The Rankine cycle typically employs individual subsystems, such as a condenser, a fluid pump, a heat exchanger such as a boiler, and an expander turbine. The pump is frequently used to pressurize the working fluid that is received from the condenser as a liquid rather than a gas. The pressurized liquid from the pump is heated at the heat exchanger and used to drive the expander turbine so as to convert thermal energy into mechanical work. Upon exiting the expander turbine, the working fluid returns to the condenser where any remaining vapor is condensed. Thereafter, the condensed working fluid returns to the pump and the cycle is repeated.

A variation of the classical Rankine cycle is the organic Rankine cycle (ORC), which is named for its use of an organic, high molecular mass fluid, with a liquid-vapor phase change, or boiling point, occurring at a lower temperature than the water-steam phase change. As such, in place of water and steam of the classical Rankine cycle, the working fluid in the ORC may be a solvent, such as n-pentane or toluene. The ORC working fluid allows Rankine cycle heat recovery from lower temperature sources such as biomass combustion, industrial wasteheat, geothermal heat, solar ponds, etc. The low-temperature heat may then be converted into useful work such as mechanical work that can be put back into the driveline on a vehicle. In other examples it may also be converted into electricity.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A transmission system selectively coupled to an engine crankshaft of an internal combustion engine arranged on a vehicle includes a waste heat recovery (WHR) system, a brake assembly and a phase-change thermal heat storage system. The WHR system selectively circulates a WHR fluid in the transmission system. The brake assembly selectively couples a transmission output shaft to a drive axle. The brake assembly is configured to operate in a braking mode that retards relative rotation between the transmission output shaft and the drive axle while generating heat. The phase-change thermal heat storage system includes a housing defining at least one cavity and a fluid transfer manifold. A phase-change material is disposed in the cavity that is configured to change phase during the braking mode. The WHR system circulates the WHR fluid through the fluid transfer manifold collecting braking heat to be used at a later time in the form of driveline power.

According to additional features, the brake assembly is an eddy current retarder. The brake assembly comprises a magnetic portion and a conductive portion. The magnetic portion includes a group of electromagnetic coils arranged in a carrier. The conductive portion includes the housing. In one example, the housing is an iron drum. An electromagnetic force is created between the electromagnetic coils and the iron drum during relative rotation of the magnetic portion and the conducting portion due to eddy currents inducted in the conductive portion through electromagnetic induction. In one example the magnetic portion is configured as a rotating component while the conductive portion remains fixed. In another arrangement, the conducting portion is configured as a rotating component while the magnetic portion remains fixed. In one example, the phase-change material comprises aluminum.

According to other features a fluid transfer tube is fluidly coupled between the WHR system and the fluid transfer manifold. The fluid transfer tube includes a valve disposed therein that selectively permits the WHR fluid circulation between the WHR system and the phase-change thermal heat storage system. Liquid waste heat recovery fluid flows into the fluid transfer manifold. Gaseous waste heat recovery fluid flows out of the fluid transfer manifold. Heat is extracted from the phase-change thermal heat storage system. The gaseous waste heat recovery fluid is used to drive an expander of the WHR system to extract thermodynamic energy.

A transmission system selectively coupled to an engine crankshaft of an internal combustion engine arranged on a vehicle according to another example of the present disclosure includes a waste heat recovery (WHR) system, an eddy current brake assembly, a phase-change thermal heat storage system and a phase-change material. The WHR system selectively circulates a WHR fluid in the transmission system. The WHR fluid is configured to collect braking heat to be used subsequently by the WHR system in the form of mechanical work. The eddy current brake assembly selectively couples a transmission output shaft to a drive axle. The eddy current brake assembly is configured to operate as an electrically controlled mechanical brake in a braking mode to retard relative rotation between the transmission output shaft and the drive axle while generating heat. The phase-change thermal heat storage system comprises a housing defining at least one cavity and a fluid transfer manifold. The phase-change material is disposed in the at least one cavity and changes phase during the braking mode. The phase-change material comprises aluminum that changes from a solid material to a molten material during the phase change.

According to additional features, the transmission system further includes a fluid transfer tube that is fluidly coupled between the WHR system and the fluid transfer manifold.

The fluid transfer tube includes a valve disposed therein that selectively permits WHR fluid circulation between the WHR system and the phase-change thermal heat storage system. Liquid waste heat recovery fluid flows into the fluid transfer manifold. Gaseous waste heat recovery fluid flows out of the fluid transfer manifold extracting heat from the phase-change thermal heat storage system. The gaseous waste heat recovery fluid is used to drive an expander of the WHR system to extract thermodynamic energy. The waste heat recovery fluid can comprise fluorochemical refrigerants or halogenated hydrocarbon. The eddy current brake assembly can comprise a magnetic portion and a conductive portion. The magnetic portion can include a group of electromagnetic coils arranged in a carrier. The conductive portion comprises the housing. The housing can include an iron drum. An electromagnetic force is created between the electromagnetic coils and the iron drum during relative rotation of the magnetic portion and the conductive portion due to eddy currents inducted in the conductive portion through electromagnetic induction.

A method of operating a transmission system that is selectively coupled to an engine crankshaft of an internal combustion engine arranged on a vehicle is provided. The vehicle is braked during a braking mode with an eddy current brake assembly. The eddy current brake assembly retards relative rotation between a transmission output shaft and a drive axle. Heat is generated during the braking mode causing a phase-change material disposed in a thermal heat storage system to change phase. Waste heat recovery (WHR) fluid is circulated through a fluid transfer manifold in the thermal heat storage system. Braking heat is collected from the thermal heat storage system with the WHR fluid. The WHR fluid is delivered to a WHR system.

In other features, the method includes communicating liquid WHR fluid into the fluid transfer manifold. Gaseous WHR fluid is communicated out of the fluid transfer manifold. The gaseous WHR fluid is converted to drive an expander of the WHR system to extract thermodynamic energy.

BRIEF DESCRIPTION OF THE DRAWINGS

The present disclosure will become more fully understood from the detailed description and the accompanying drawings, wherein.

DETAILED DESCRIPTION

Figure 1:
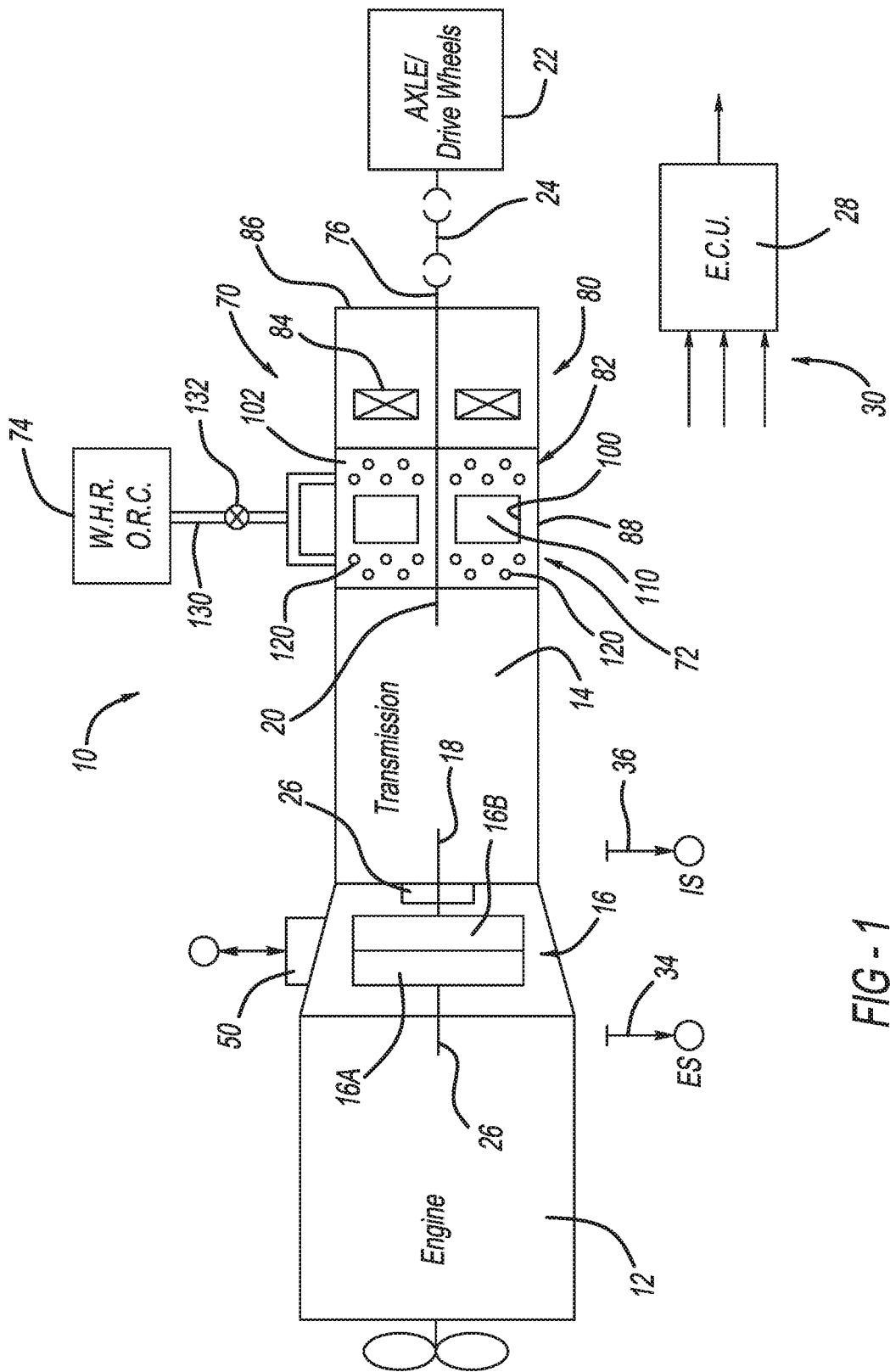
FIG. 1 is a schematic of transmission system coupled to an engine, the transmission system incorporating an eddy current brake assembly, a phase-change thermal heat storage system and waste heat recovery system according to one example of the present disclosure.

With initial reference to FIG. 1, transmission system constructed in accordance to one example of the present disclosure is shown and generally referred to at reference 10. The transmission system 10 is selectively coupled to a fuel-controlled engine 12 (such as a diesel engine or the like), a multiple-speed, change-gear transmission 14 and a master clutch 16 drivingly interposed between the engine 12 and an input shaft 18 of the transmission 14. The transmission 14 may be of the compound type comprising a main transmission section connected in series with a splitter and/or range-type auxiliary section. Transmissions of this type, especially as used with heavy duty vehicles, typically have 9, 10, 12, 13, 16 or 18 forward speeds. A transmission output shaft 20 extends outwardly from the transmission 14 and is ultimately drivingly connected with vehicle drive axles 22, usually by means of a prop shaft 24.

The master clutch 16 includes a driving portion 16A connected to an engine crankshaft/flywheel 26 and a driven portion 16B coupled to the transmission input shaft 18 and adapted to frictionally engage the driving portion 16A. An electronic control unit (ECU) 28 is provided for receiving input signals 30 and for processing same in accordance with predetermined logic rules to issue command output signals to the transmission system 10. The transmission system 10 can also include a rotational speed sensor 34 for sensing rotational speed of the engine 12 and providing an output signal (ES) indicative thereof, a rotational speed sensor 36 for sensing the rotational speed of the input shaft 18 and providing an output signal (IS) indicative thereof, and a rotational speed sensor 38 for sensing the speed of the output shaft 20 and providing an output signal (OS) indicative thereof. The master clutch 16 may be controlled by a clutch actuator 50 responding to output signals from the ECU 28.

The transmission system 10 according to the present disclosure further includes an eddy current retarder or brake assembly 70, a phase-change thermal heat storage system 72 and a waste heat recovery (WHR) system 74. As will become appreciated from the following discussion, the phase-change thermal heat storage system 72 provides another heat source that energy can be extracted for use with the WHR system 74. The transmission system 10 can be implemented on a vehicle (see vehicle 200, FIG. 2) to operate the vehicle more efficiently as a thermal hybrid improving fuel economy.

The eddy current brake assembly 70 selectively couples the output shaft 20 of the transmission 14 to an output shaft 76 of the brake assembly 70. The output shaft 76 is drivingly coupled to the axle 22 through the prop shaft 24. In general, the eddy current brake assembly 70 can be used to brake relative rotation between the output shaft 20 of the transmission and the output shaft 76 of the brake assembly 70, and therefore brake the vehicle such as while the vehicle is going downhill. Braking the vehicle with the eddy current brake assembly 70 can assist and/or intermittently take the place of conventional wheel brakes improving the longevity of the wheel brakes. The eddy current brake assembly 70 is an electrically controlled mechanical brake. The eddy current brake assembly 70 generally includes a magnetic portion 80 and a conductive portion 82.

In the example shown, the magnetic portion 80 includes a group of electromagnetic coils 84 arranged in a carrier 86 and the conductive portion 82 includes a housing in the form of an iron drum 88. During relative rotation of the magnetic portion 80 and the conductive portion 82, an electromagnetic force is created between the electromagnetic coils 84 and the iron drum 88 due to eddy currents induced in the conductive portion 82 through electromagnetic induction. It will be appreciated that while the present discussion is directed toward an eddy current retarder, other retarders suitable for dissipating energy such as mechanical, hydraulic and pneumatic retarders may be employed.

In typical eddy current retarders, heat will be created in the rotating component and the rotating component moves ambient air to dissipate the heat. According to the present teachings, rather than dissipating the heat exclusively through ambient air, the iron drum 88 absorbs the heat for use with the phase-change thermal heat storage system 72.

When electricity is applied to the electromagnet coils 84, the eddy current brake assembly 70 creates the mechanical retardation between the shafts 20 and 76 while generating heat in the iron drum 88. In one example, the magnetic portion 80 can be configured as the rotating component while the conductive portion 82 is configured as the stationary component. In another example, the conductive portion 82 can be configured as the rotating component while the magnetic portion 80 is configured as the stationary component. While not shown, slip rings or other configurations can be incorporated to permit electrical and/or fluid transfer into the rotating component.

The phase-change thermal heat storage system 72 will be further described. The phase-change thermal heat storage system 72 generally comprises at least one cavity 100 and a fluid transfer manifold 102. The cavity 100 contains a phase-change material 110 that has a high capacity for absorbing heat such as aluminum. Other materials may be used such as, but not limited to, waxes. As the iron drum 88 absorbs heat, the phase-change material 110 melts (in this example into molten aluminum) and absorbs energy. The fluid transfer manifold 102 can include at least one and preferably a plurality of fluid conduits 120 that communicate waste heat recovery fluid between the iron drum 88 and the WHR system 74 through a fluid transfer tube 130.

The fluid transfer tube 130 can incorporate a valve 132 for selectively permitting fluid communication between the WHR system 74 and the fluid transfer manifold 102. It is contemplated that a controller such as the ECU 28 can communicate a signal to the valve 132 to open and close the valve 132 as desired. It is further appreciated that the configuration of the fluid transfer manifold 102 and the fluid transfer tube 130 shown in FIG. 1 is merely exemplary and other configurations are contemplated.

When the vehicle is operating in a powering mode, the WHR system 74 is operated such that the waste heat recovery fluid in the fluid conduits 120 is circulated through the fluid transfer manifold 102 collecting the braking heat to be used at a later time in the form of driveline power. The waste heat recovery fluid can comprise any suitable fluid such as fluorochemical refrigerants or halogenated hydrocarbon. Other fluids such as, but not limited to ammonia or alcohol may be used. In this regard, the thermal energy can be extracted to be converted back to work at a later time such as during the drive cycle when propulsive energy is required. Energy is absorbed by creating heat in the iron drum 88 and energy is desorbed by circulating the waste heat recovery fluid between the WRH system 74 and the manifold 102 for later converting that energy back to mechanical work.

While the WHR system 74 is shown circulating waste heat recovery fluid with the phase-change thermal heat storage system 72, the WHR system 74 can be configured to additionally circulate heat with other systems of the vehicle such as an exhaust gas recirculation (EGR) unit, an exhaust pipe heat exchanger and/or the charge air coolant system. In this regard, the WHR system 74 can be used concurrently with other conventional vehicle systems known to provide suitable heat sources.

Figure 2:
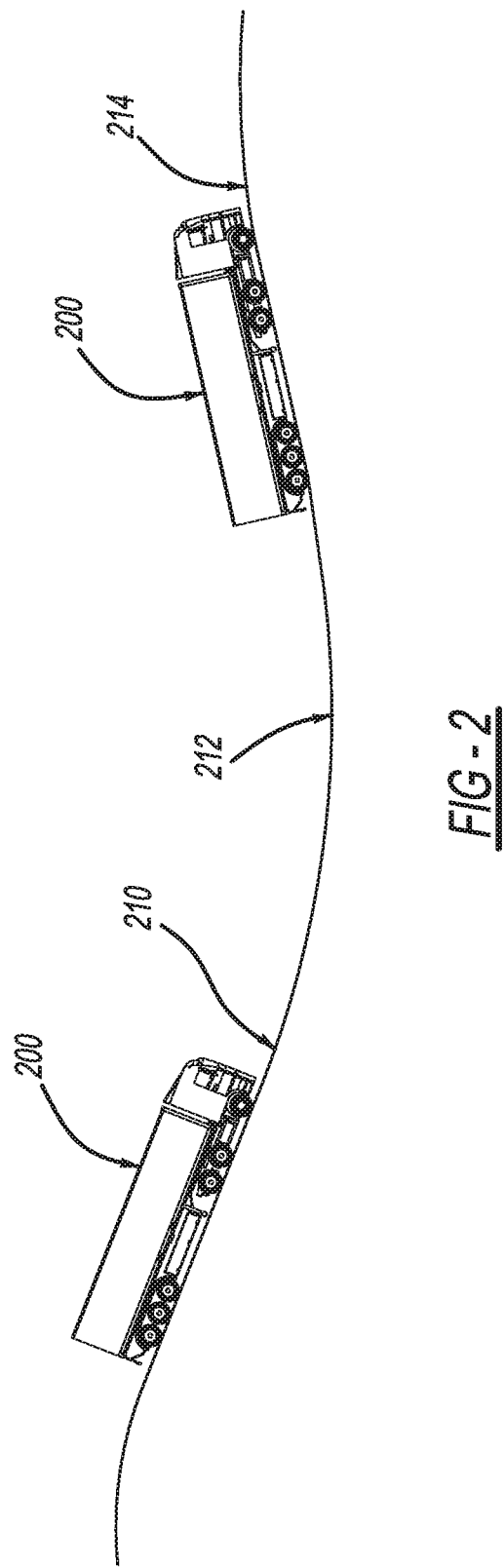
FIG. 2 is a schematic illustration of an exemplary vehicle that incorporates the transmission system of FIG. 1 and is operating along a road having a downgrade portion and an upgrade portion.

With additional reference now to FIG. 2, an exemplary method of operating the transmission system 10 will be described. The transmission system 10 can be incorporated into vehicle 200. As the vehicle 200 travels along a downgrade portion of road 210, supplemental vehicle speed retardation is achieved by activating the eddy current brake assembly 70. Again, as the electromagnetic coils 84 are energized, an electromagnetic force is created between the electromagnetic coils 84 and the iron drum slowing relative rotation of the shafts 20 and 76 while creating heat in the phase-change thermal heat storage system 72. Once the heat of the iron drum 88 reaches a phase change temperature of the phase change material 110, the phase change material 110 melts.

After travelling down the road downgrade 210, the vehicle 200 travels along a generally zero grade portion of road 212 and approaches an upgrade portion of road 214. At this time, the valve 132 is opened allowing the liquid waste heat recovery fluid to flow into the manifold 102 and gaseous waste heat recovery fluid to flow out of the manifold 102 extracting the heat from the phase-change thermal heat storage system 72. The gaseous waste heat recovery fluid is used to drive an expander of the WHR system 74 to extract thermodynamic energy.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A transmission system selectively coupled to an engine crankshaft of an internal combustion engine arranged on a vehicle, the transmission system comprising:
   a waste heat recovery (WHR) system that selectively circulates a WHR fluid in the transmission system;
   a brake assembly that selectively couples a transmission output shaft to a drive axle, the brake assembly configured to operate in a braking mode that retards relative rotation between the transmission output shaft and the drive axle while generating heat; and
   a phase-change thermal heat storage system comprising a housing defining at least one cavity and a fluid transfer manifold, wherein a phase-change material is disposed in the cavity that is configured to change phase during the braking mode, the WHR system circulating the WHR fluid though the fluid transfer manifold collecting braking heat to be used at a later time in the form of driveline power.

2. The transmission system of claim 1 wherein the brake assembly is an eddy current retarder.

3. The transmission system of claim 2 wherein the brake assembly comprises a magnetic portion and a conductive portion.

4. The transmission system of claim 3 wherein the magnetic portion includes a group of electromagnetic coils arranged in a carrier and the conductive portion comprises the housing.

5. The transmission system of claim 4 wherein the housing comprises an iron drum.

6. The transmission system of claim 5 wherein during relative rotation of the magnetic portion and the conductive portion, an electromagnetic force is created between the electromagnetic coils and the iron drum due to eddy currents inducted in the conductive portion through electromagnetic induction.

7. The transmission system of claim 6 wherein the magnetic portion is configured as a rotating component while the conductive portion remains fixed.

8. The transmission system of claim 6 wherein the conductive portion is configured as a rotating component while the magnetic portion remains fixed.

9. The transmission system of claim 1 wherein the phase-change material comprises aluminum.

10. The transmission system of claim 1, further comprising a fluid transfer tube fluidly coupled between the WHR system and the fluid transfer manifold, wherein the fluid transfer tube includes a valve disposed therein that selectively permits the WHR fluid circulation between the WHR system and the phase-change thermal heat storage system.

11. The transmission system of claim 10 wherein liquid waste heat recovery fluid flows into the fluid transfer manifold and gaseous waste heat recovery fluid flow out of the fluid transfer manifold extracting the heat from the phase-change thermal heat storage system, the gaseous waste heat recovery fluid used to drive an expander of the WHR system to extract thermodynamic energy.

12. A transmission system selectively coupled to an engine crankshaft of an internal combustion engine arranged on a vehicle, the transmission system comprising:
   a waste heat recovery (WHR) system that selectively circulates a WHR fluid in the transmission system, the WHR fluid configured to collect braking heat to be used subsequently by the WHR system in the form of mechanical work;
   an eddy current brake assembly that selectively couples a transmission output shaft to a drive axle, the eddy current brake assembly configured to operate as an electrically controlled mechanical brake in a braking mode to retard relative rotation between the transmission output shaft and the drive axle while generating heat;
   a phase-change thermal heat storage system comprising a housing defining at least one cavity and a fluid transfer manifold; and
   a phase-change material disposed in the at least one cavity that changes phase during the braking mode, the phase-change material comprising aluminum that changes from a solid material to a molten material during the phase change.

13. The transmission system of claim 12, further comprising a fluid transfer tube fluidly coupled between the WHR system and the fluid transfer manifold, wherein the fluid transfer tube includes a valve disposed therein that selectively permits the WHR fluid circulation between the WHR system and the phase-change thermal heat storage system.

14. The transmission system of claim 13 wherein liquid waste heat recovery fluid flows into the fluid transfer manifold and gaseous waste heat recovery fluid flow out of the fluid transfer manifold extracting the heat from the phase-change thermal heat storage system, the gaseous waste heat recovery fluid used to drive an expander of the WHR system to extract thermodynamic energy.

15. The transmission system of claim 14 wherein the waste heat recovery fluid comprises a fluorochemical refrigerant.

16. The transmission system of claim 12 wherein the eddy current brake assembly comprises a magnetic portion and a conductive portion, the magnetic portion including a group of electromagnetic coils arranged in a carrier, the conductive portion comprises the housing.

17. The transmission system of claim 16 wherein the housing comprises an iron drum.

18. The transmission system of claim 17 wherein during relative rotation of the magnetic portion and the conductive portion, an electromagnetic force is created between the electromagnetic coils and the iron drum due to eddy currents inducted in the conductive portion through electromagnetic induction.

19. A method of operating a transmission system that is selectively coupled to an engine crankshaft of an internal combustion engine arranged on a vehicle, the method comprising:
   braking the vehicle during a braking mode with an eddy current brake assembly, the eddy current brake assembly retarding relative rotation between a transmission output shaft and a drive axle;
   generating heat during the braking mode causing a phase-change material disposed in a thermal heat storage system to change phase;
   circulating waste heat recovery (WHR) fluid through a fluid transfer manifold in the thermal heat storage system;
   collecting braking heat from the thermal heat storage system with the WHR fluid; and
   delivering the WHR fluid to a WHR system.

20. The method of claim 19, further comprising:
   communicating liquid WHR fluid into the fluid transfer manifold;
   communicating gaseous WHR fluid out of the fluid transfer manifold; and
   converting the gaseous WHR fluid to drive an expander of the WHR system to extract thermodynamic energy.

* * * * *